United States Patent
Li et al.

(10) Patent No.: US 7,436,632 B2
(45) Date of Patent: Oct. 14, 2008

(54) DIFFERENTIAL/DUAL CPP RECORDING HEAD

(75) Inventors: Shaoping Li, Naperville, IL (US); Song Xue, Edina, MN (US); Kaizhong Gao, Eden Prairie, MN (US); Patrick Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 484 days.

(21) Appl. No.: 10/880,879

(22) Filed: Jun. 30, 2004

(65) Prior Publication Data

US 2006/0002032 A1 Jan. 5, 2006

(51) Int. Cl.
    G11B 5/39 (2006.01)
(52) U.S. Cl. ..................................... 360/315
(58) Field of Classification Search ........................ None
    See application file for complete search history.

(56) References Cited

U.S. PATENT DOCUMENTS

| | | | | |
|---|---|---|---|---|
| 3,448,440 | A | | 6/1969 | Wiegand ..................... 340/174 |
| 4,075,671 | A | | 2/1978 | Cheatham et al. ........... 360/113 |
| 4,112,408 | A | | 9/1978 | Roozenbeek ................. 338/32 |
| 4,150,314 | A | | 4/1979 | Zabler et al. ................ 310/155 |
| 4,374,403 | A | | 2/1983 | Oshima et al. .............. 360/113 |
| 5,668,688 | A | * | 9/1997 | Dykes et al. ............. 360/324.1 |
| 6,005,753 | A | | 12/1999 | Fontana, Jr. et al. ......... 360/113 |
| 6,275,363 | B1 | | 8/2001 | Gill ......................... 360/324.2 |
| 6,445,171 | B2 | | 9/2002 | Sandquist et al. ........... 324/117 |
| 6,473,275 | B1 | | 10/2002 | Gill ............................ 360/314 |
| 6,566,856 | B2 | | 5/2003 | Sandquist et al. ........... 324/117 |
| 6,633,461 | B2 | | 10/2003 | Gill ............................ 360/314 |
| 6,661,620 | B2 | | 12/2003 | Seigler et al. ............... 360/314 |
| 6,670,809 | B1 | | 12/2003 | Edelstein et al. ............ 324/244 |
| 6,741,432 | B2 | * | 5/2004 | Pinarbasi ............... 360/324.11 |
| 6,751,072 | B2 | * | 6/2004 | Freitag et al. .......... 360/324.11 |
| 6,781,798 | B2 | * | 8/2004 | Gill ............................ 360/314 |
| 6,927,948 | B2 | * | 8/2005 | Gill ............................ 360/314 |
| 2002/0135946 | A1 | | 9/2002 | Gill ........................ 360/324.2 |
| 2003/0179481 | A1 | | 9/2003 | McNeil et al. ................ 360/48 |
| 2003/0184918 | A1 | | 10/2003 | Lin et al. .................... 360/314 |
| 2004/0017639 | A1 | | 1/2004 | Deak ......................... 360/290 |

OTHER PUBLICATIONS

Marvin Camras, "Magnetic Modulator Heads," Magnetic Recording Handbook, Van Nostrand Reinhold Co. Inc, 1988, pp. 236-239.
Kanu G. Ashar, "Magnetic Disc Drive Technology: Heads, Media, Channel, Interfaces and Integration," Magnetic Disk Drive Technology, IEEE Press, 1997, pp. 198-200.
Harold B. Crawford et al., "Hall Effect Magnetoresistive Modulators," Electronic Designer's Handbook, McGraw-Hill, Inc., 1977, Section 13.16g, pp. 13-145 through 13-146.

* cited by examiner

*Primary Examiner*—Mark Blouin
(74) *Attorney, Agent, or Firm*—Westman, Champlin & Kelly, P.A.

(57) ABSTRACT

A magnetic sensor for reading information from a magnetic medium. The magnetic sensor includes a bottom electrode and a first sensor disposed above the bottom electrode. The magnetic sensor also includes a middle electrode disposed above the first sensor, a second sensor disposed above the middle electrode and a top electrode disposed above the second sensor. The bottom electrode, the middle electrode and the top electrode are utilized to electrically connect the first sensor and the second sensor in parallel.

23 Claims, 16 Drawing Sheets

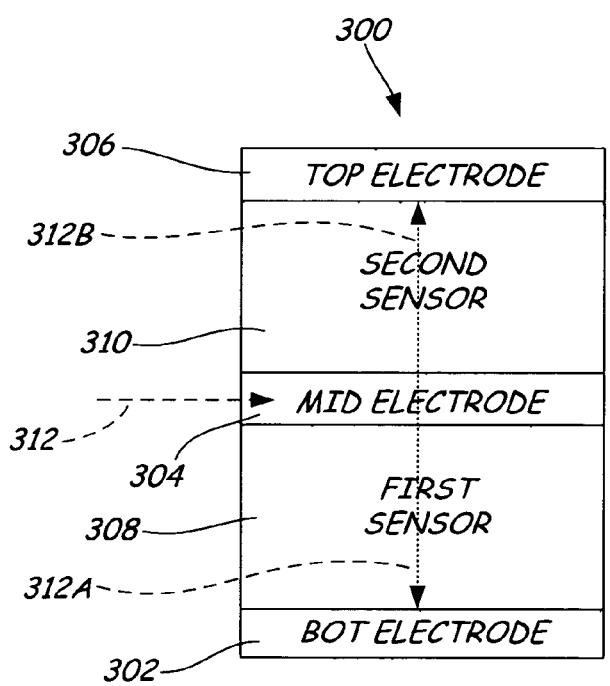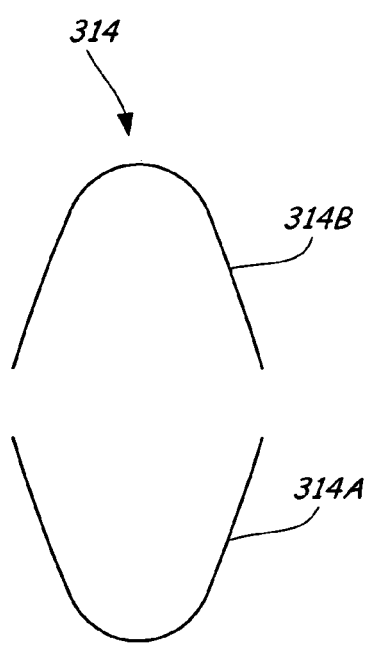
FIG. 3-1    FIG. 3-2

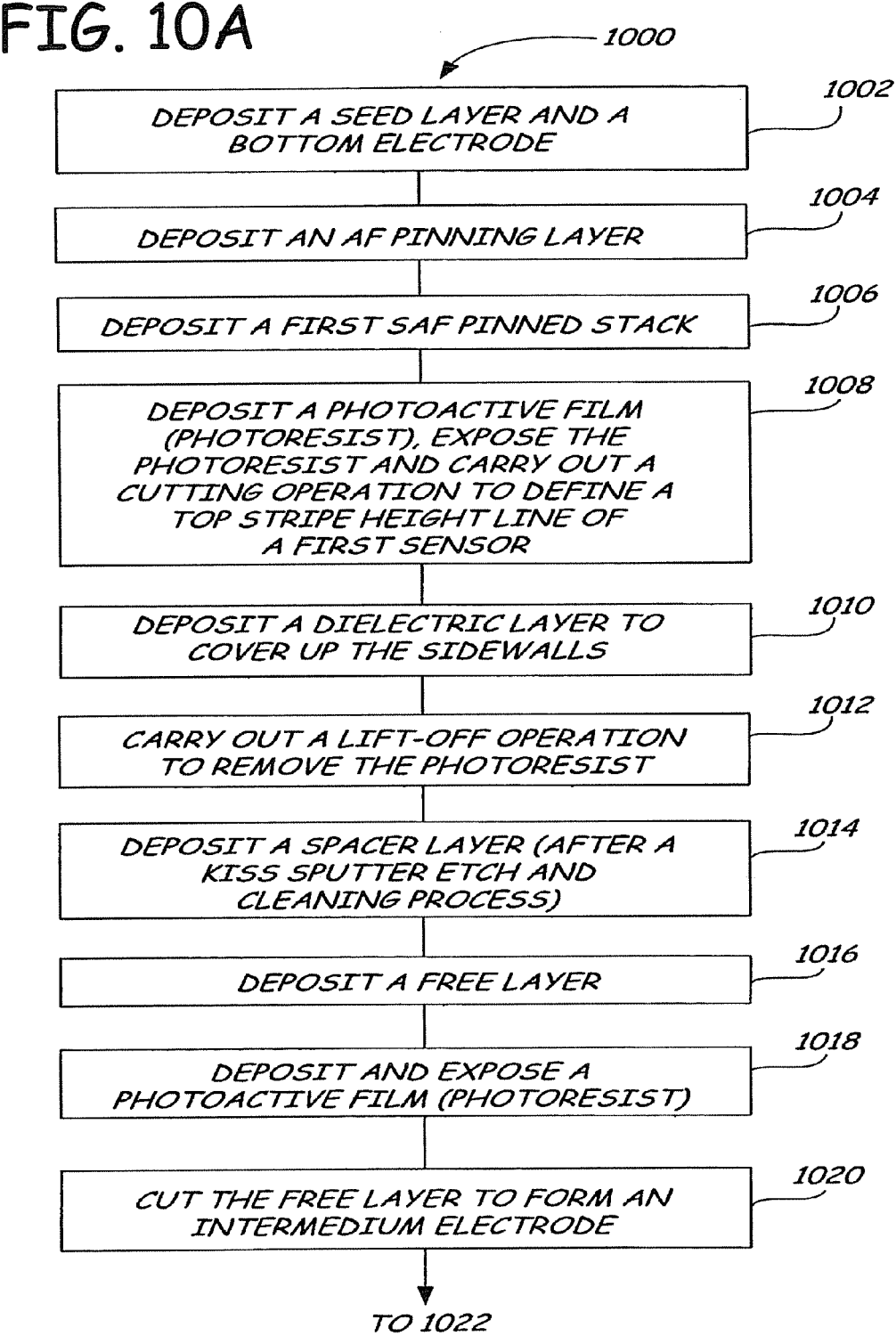

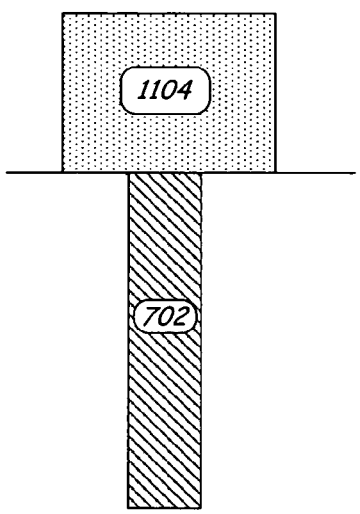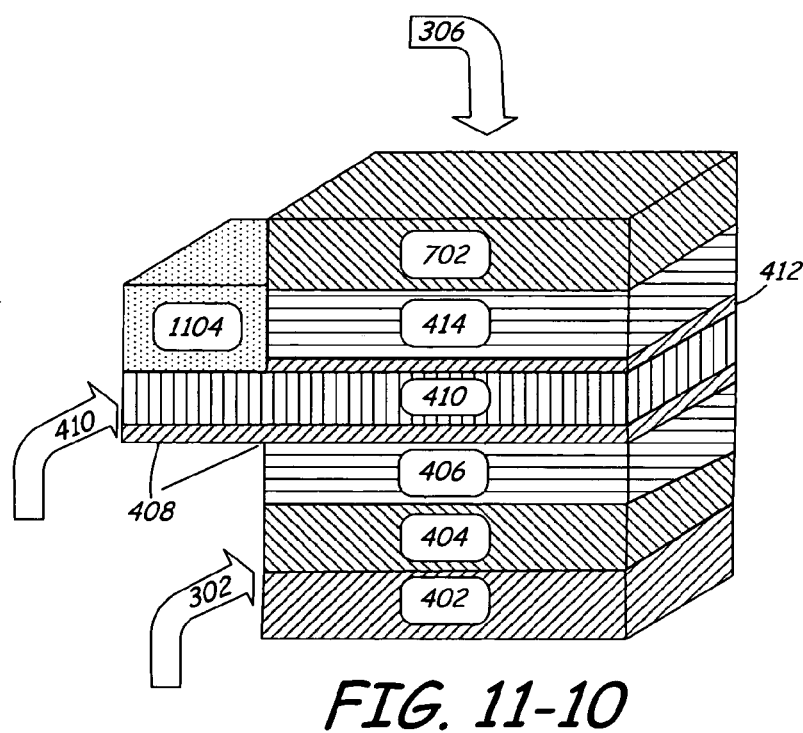
FIG. 11-9    FIG. 11-10

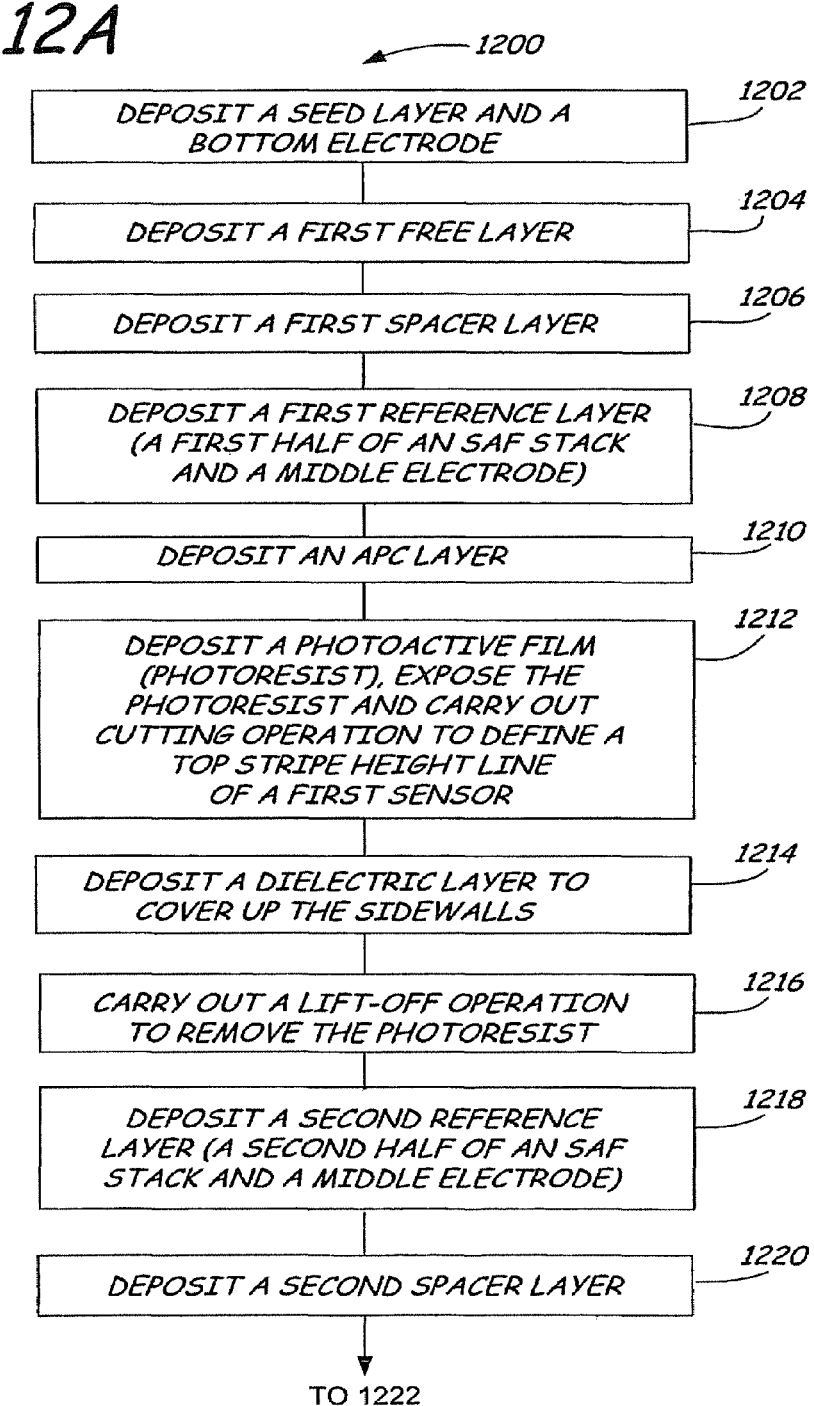

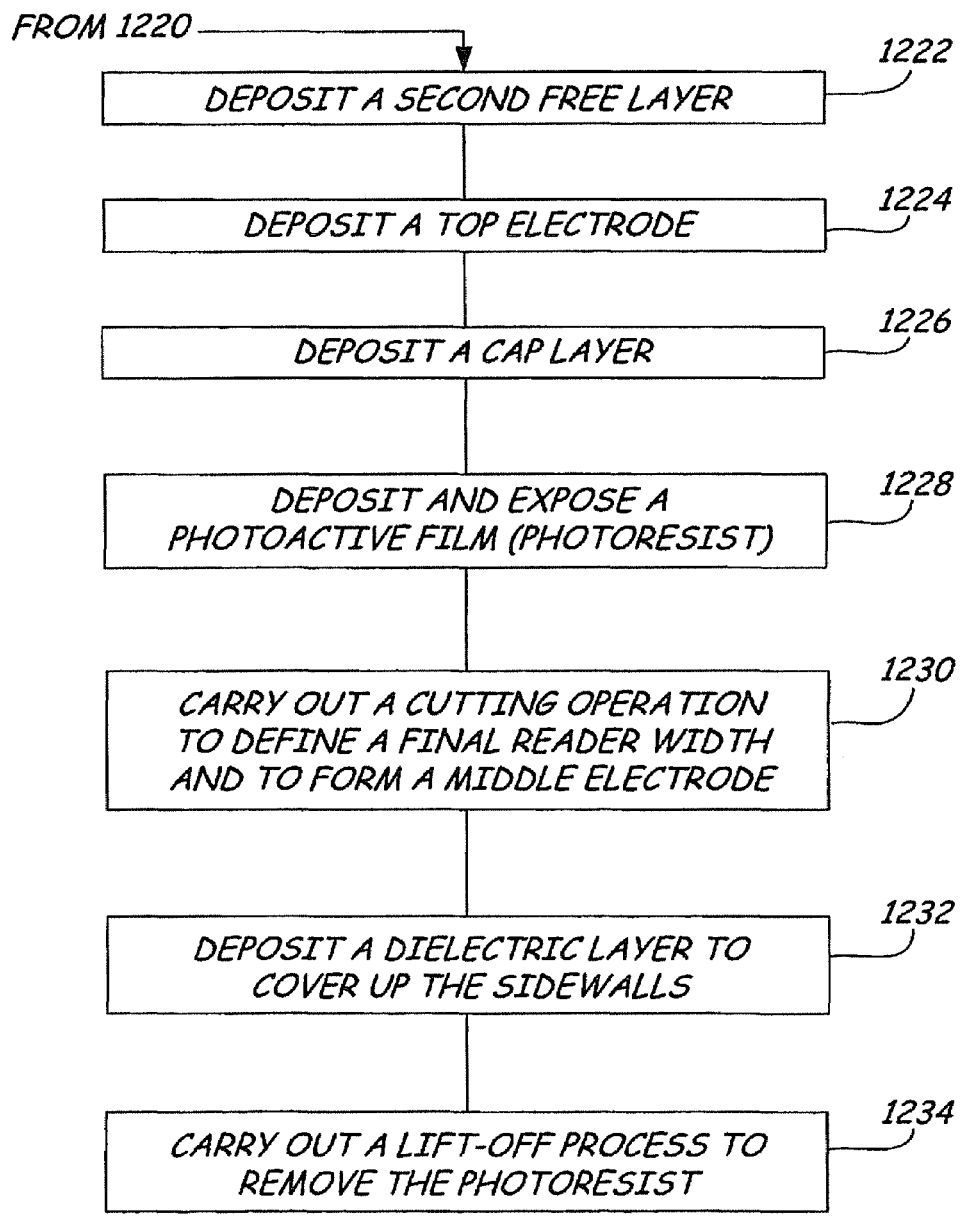

DIFFERENTIAL/DUAL CPP RECORDING HEAD

FIELD OF THE INVENTION

The present invention relates generally to magnetic data storage systems, and more particularly but not by limitation to a differential/dual current-perpendicular-to-plane (CPP) magnetic sensor used in such systems.

BACKGROUND OF THE INVENTION

Disc drives are the primary data storage devices employed for mass storage of computer programs and data used in computer systems. Disc drives typically use rigid discs, which are coated with a magnetizable medium for storage of digital information in a plurality of circular, concentric data tracks. Read and write heads are adapted to read information from and write information to the data tracks.

The read and write heads are carried by a slider which is connected to an actuator mechanism through a gimbaled attachment. The actuator mechanism moves the slider from track-to-track across the surface of the disc under control of electronic circuitry. The actuator mechanism includes a suspension assembly that applies a load force to the slider to urge the slider toward the disc. As the disc rotates, air is dragged and compressed under an air bearing surface (ABS) of the slider that creates a hydrodynamic lifting force, which counteracts the load force and causes the slider to lift and "fly" in close proximity to the disc surface. The gimbaled attachment between the slider and the suspension assembly allows the slider to pitch and roll as it follows the topography of the disc. During rotation of the disc the write head writes magnetic bits of information (signal fields) to the disc and the read head senses the magnetic bits (signal fields) from the disc. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A magnetic gap is formed between the first and second pole piece layers by a write gap layer at an air bearing surface (ABS) of the write head. The pole piece layers are connected at a back gap. Current conducted to the coil layer induces a magnetic field across the gap between the pole pieces. This field fringes across the gap at the ABS for the purpose of writing the aforementioned magnetic bits in circular tracks on the rotating disc. It should be noted that both longitudinal and perpendicular recording methods are utilized for writing information on disc surfaces.

A typical sensor employed by recent read heads for sensing signal fields from the rotating magnetic disc is a spin valve sensor. The spin valve sensor includes a nonmagnetic spacer layer sandwiched between a ferromagnetic pinned layer and a ferromagnetic free layer. First and second leads are connected to the spin valve sensor for conducting a sense current therethrough. The magnetization of the pinned layer is pinned perpendicular to the ABS and the magnetic moment of the free layer is located parallel to the ABS but free to rotate in response to external magnetic fields. The magnetization of the pinned layer is typically pinned by exchange coupling with an antiferromagnetic layer. The thickness of the spacer layer is chosen to be less than the mean free path of conduction electrons through the sensor. With this arrangement, a portion of the conduction electrons is scattered in phase by the interfaces of the spacer layer with the pinned and free layers. When the magnetizations of the pinned and free layers are parallel scattering is at a minimum and when the magnetizations of the pinned and free layers are antiparallel, scattering is at a maximum. Changes in scattering alter the resistance of the spin valve sensor in proportion to cos θ, where θ is the angle between the magnetizations of the pinned and free layers. When a sense current is conducted through the spin valve sensor in a direction parallel to surface planes of the layers resistance changes cause potential changes that are detected and processed as playback signals by the processing circuitry.

Another type of sensor is a tunnel junction sensor which receives a tunneling current perpendicular to the surface planes of the layers. The tunneling junction sensor includes a nonmagnetic nonconductive spacer layer between a ferromagnetic reference layer and a ferromagnetic free layer. The spacer layer, which may be an oxide, is thin enough that electron tunneling occurs between the free and reference layers. The resistance of the sensor is spin dependent, which means that the resistance of the sensor changes as a function of the relative orientation of the magnetic moments of the free and pinned layers. The pinned layer is located on and exchange coupled to an antiferromagnetic pinning layer, which pins a magnetic moment of the pinned layer in a first direction, which is typically perpendicular to the ABS. The free layer has a magnetic moment, which is free to rotate in response to signal fields from the rotating disc. A tunneling current tunnels through the spacer layer. When the magnetic moments of the free and reference layers are parallel the resistance to the tunneling current is at a minimum, and when these moments are antiparallel the resistance to the tunneling current is at a maximum. Accordingly, as the tunneling current is conducted through the tunnel junction sensor increases and decreases in the resistance of the sensor causes potential changes that are processed by the aforementioned processing circuitry as playback signals. The processing circuitry employs these potential changes to produce readback signals.

As an ever-increasing amount of information is stored on a magnetic medium, it becomes difficult for MR sensors to separately read the stored information without also reading noise from adjacent stored information. Thus, as areal densities increase, there has to be a corresponding increase in a sensitivity of the MR sensors. In general, the sensitivity of the above-described conventional spin valve and tunnel junction MR sensors cannot be increased easily without altering dimensions (such as thickness, cross-track width, etc.) of the sensor. Therefore, such sensors may encounter certain limitations when used in very high areal density applications.

Embodiments of the present invention provide solutions to these and other problems, and offer other advantages over the prior art.

SUMMARY OF THE INVENTION

A magnetic sensor for reading information from a magnetic medium is provided. The magnetic sensor includes a bottom electrode and a first sensor disposed above the bottom electrode. The magnetic sensor also includes a middle electrode disposed above the first sensor, a second sensor disposed above the middle electrode and a top electrode disposed above the second sensor. The bottom electrode, the middle electrode and the top electrode are utilized to electrically connect the first sensor and the second sensor in parallel.

Other features and benefits that characterize embodiments of the present invention will be apparent upon reading the following detailed description and review of the associated drawings.

BRIEF DESCRIPTION OF THE DRAWINGS

FIG. 2 is a cross-sectional view of a piggyback magnetic head that includes a magnetic sensor of the present invention.

FIG. 8-1 is a diagrammatic representation of a three-terminal device formed using a magnetic sensor of the present invention.

FIG. 8-2 is a top view of a three-terminal device formed using a magnetic sensor of the present invention.

FIG. 9-1 is a diagrammatic representation of a two-terminal device formed using a magnetic sensor of the present invention.

FIG. 9-2 is a top view of a two-terminal device formed using a magnetic sensor of the present invention.

FIG. 12 is a flowchart of another method embodiment of the present invention.

DETAILED DESCRIPTION OF ILLUSTRATIVE EMBODIMENTS

Figure 1:
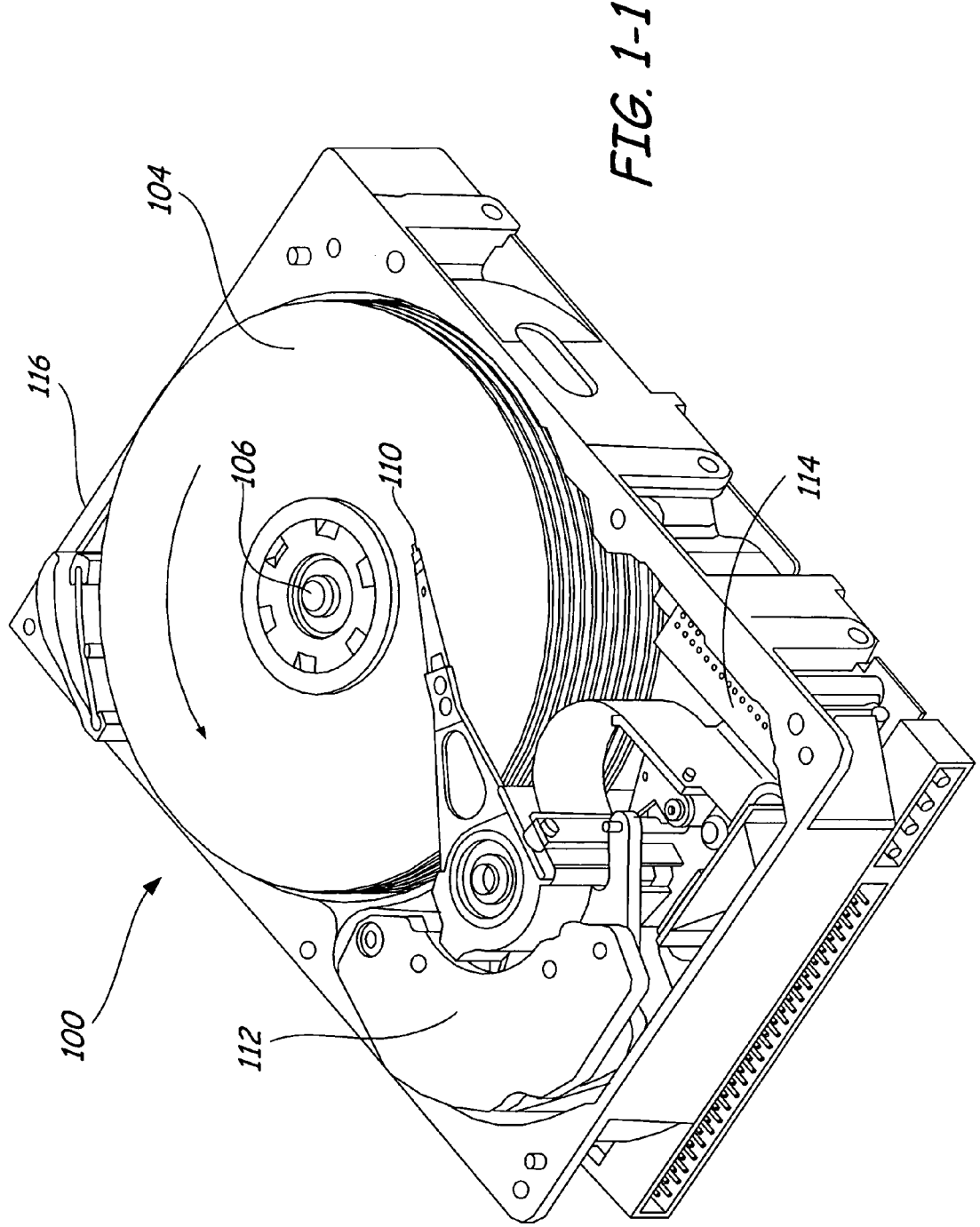
FIGS. 1-1 and 1-2 are diagrammatic and system block views, respectively, of an exemplary fixed disc drive for which embodiments of the present invention are useful.

Referring now to FIG. 1-1, a diagrammatic view of disc drive 100 with which the present invention is useful is shown. Disc drive 100 includes discs 104, spindle 106, spindle motor 126 (shown in FIG. 1-2), magnetic head 110, actuator 112, and board electronics 114. Board electronics 114 include disc controller 124 (shown in FIG. 1-2).

Controller 124 is typically a microprocessor, or digital computer, and is coupled to a host system 118, or another drive controller, which controls a plurality of drives. Controller 124 operates based on programmed instructions received from the host system.

Discs 104 are fixed about spindle 106, which is coupled to spindle motor 126 such that energization of spindle motor 126 causes spindle 106 and discs 104 to rotate. When discs 104 rotate, magnetic heads 110 fly above/below discs 104 on thin films of air or liquid that carry magnetic heads 110 for communicating with the respective disc surfaces. Actuator 112 is coupled to controller 124 and is adapted to move heads 110 relative to the surfaces of discs 104 in response to an actuation signal from controller 124.

Magnetic heads 110 may be a piggyback magnetic heads or merged magnetic heads that are employed for recording information in multiple circular tracks on the respective disc surfaces as well as for reading information therefrom.

Figures 1, 2:
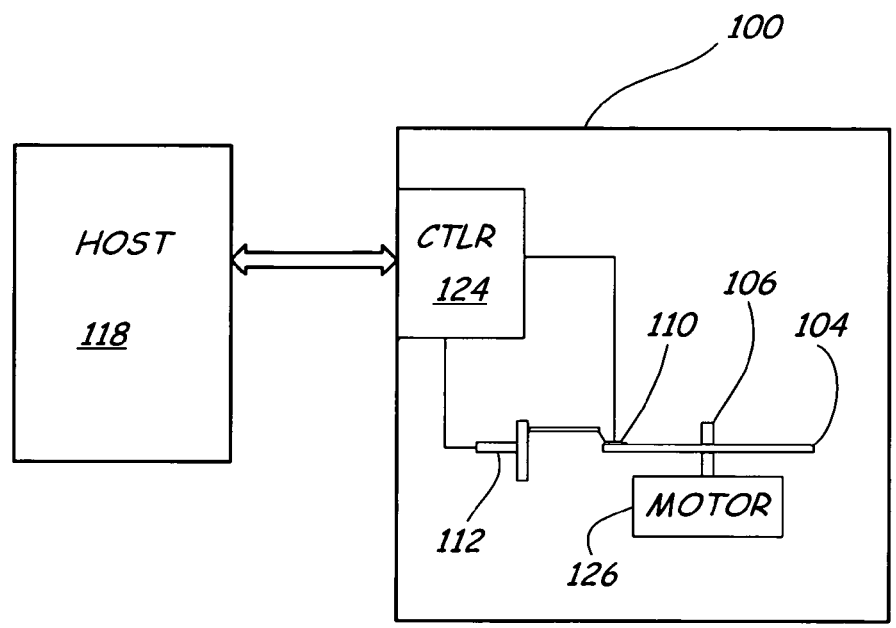
Figure 2:
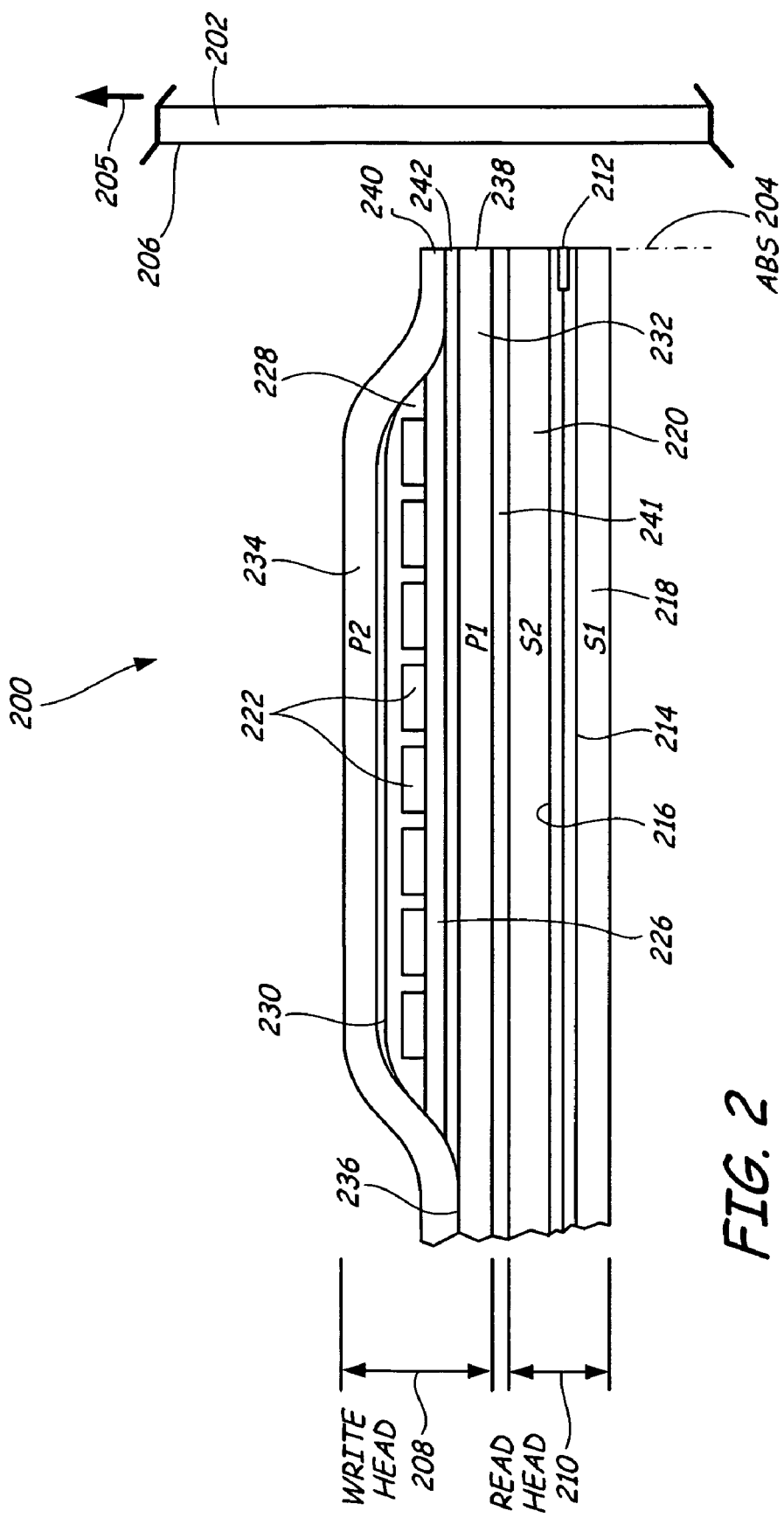

FIG. 2 is a side cross-sectional elevation view of a piggyback magnetic head 200 and a magnetic disc 202 taken along a plane normal to an air bearing surface (ABS) 204 of magnetic head 200. FIG. 2 illustrates magnetic head 200 and its placement relative to magnetic disc 202. ABS 204 of magnetic head 200 faces disc surface 206 of magnetic disc 202. Magnetic disc 202 travels or rotates in a direction relative to magnetic head 200 as indicated by arrow 205. The spacing between air bearing surface 204 and disc surface 206 is preferably minimized while avoiding contact between magnetic head 200 and magnetic disc 202.

Magnetic head 200 includes a write head portion 208 and a read head portion 210, the read head portion employing a magnetic sensor 212 of the present invention. Magnetic sensor 212 is sandwiched between nonmagnetic nonconductive first and second read gap layers 214 and 216, and the read gap layers are sandwiched between ferromagnetic first and second shield layers 218 and 220. In response to external magnetic fields, the resistance of magnetic sensor 212 changes. A sensing current Is conducted through the magnetic sensor causes these resistance changes to be manifested as potential changes. These potential changes are then processed as readback signals by processing circuitry (not shown). First and second shield layers 218 and 220 may serve as leads for the magnetic sensor 212 for conducting the sensing current Is to the magnetic sensor and may be connected thereto by conductive vias (not shown) which extend through the first and second read gap layers 214 and 216.

Write head portion 208 of magnetic head 200 includes a coil layer 222 sandwiched between first and second insulation layers 226 and 228. A third insulation layer 230 may be employed for planarizing the head to eliminate ripples in the second insulation layer caused by coil layer 222. The first, second and third insulation layers are referred to in the art as an "insulation stack." Coil layer 222 and the first, second and third insulation layers 226, 228 and 230 are sandwiched between first and second pole piece layers 232 and 234. First and second pole piece layers 232 and 234 are magnetically coupled at a back gap 236 and have first and second pole tips 238 and 240, which are separated by a write gap layer 242 at ABS 204. An insulation layer 241 is located between second shield layer 220 and first pole piece layer 232. Since second shield layer 220 and first pole piece layer 232 are separate layers, this head is known as a piggyback head. If head 200 were a merged head, second shield layer 220 and pole piece layer 232 would be a common/merged layer.

As mentioned above, prior art magnetic sensors have certain disadvantages (that were noted earlier) when utilized for high areal density applications. Under the present invention, a differential/dual magnetic sensor is provided in which a differential read-back signal (a pair of complementary readback signals referenced to one another) is produced. Such a differential read-back signal has a magnitude that is double that of a single read-back signal referenced to ground, which is produced by a typical prior art magnetic sensor of comparable size.

Figures 1, 11:
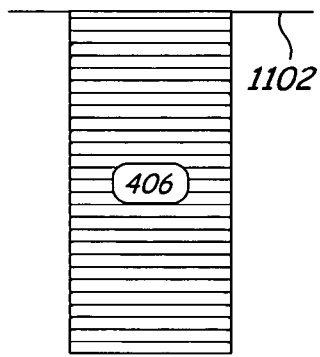
FIG. 11 illustrates top and cross-sectional views of different magnetic sensor layers during fabrication of a magnetic sensor in accordance with the method of FIG. 10.
Figures 2, 11:
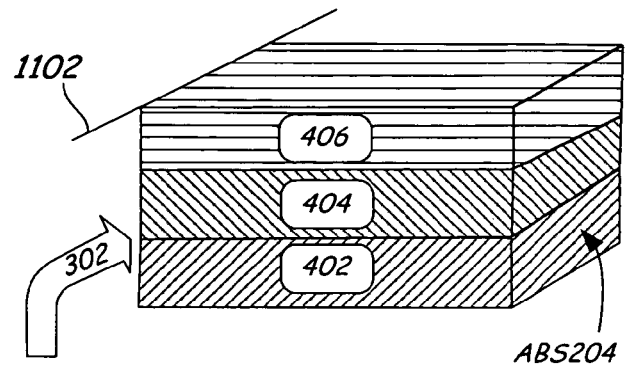
Figures 3, 11:
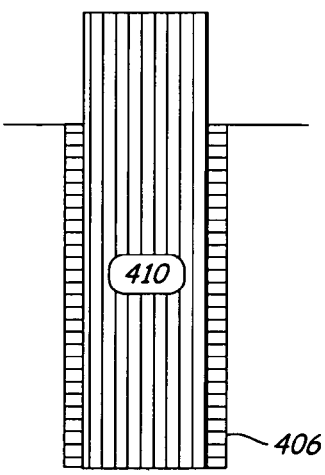
FIG. 3 is an air bearing surface view of a magnetic sensor in accordance with an embodiment of the present invention.
Figures 4, 11:
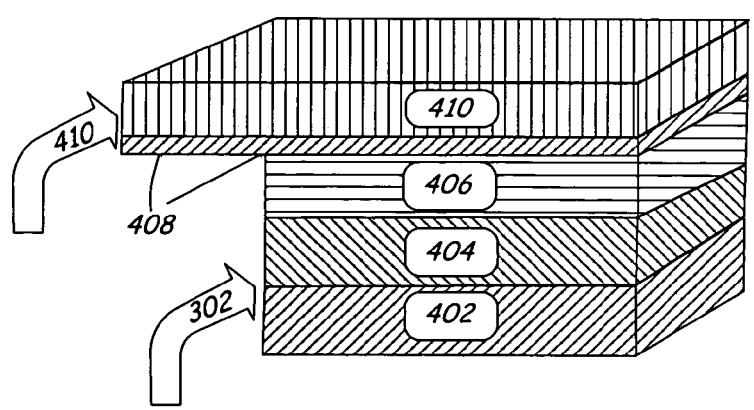
Figures 5, 11:
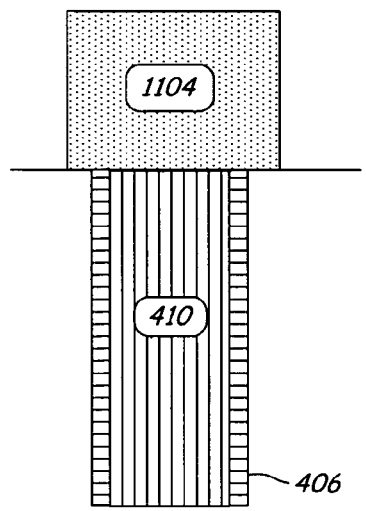
Figures 6, 11:
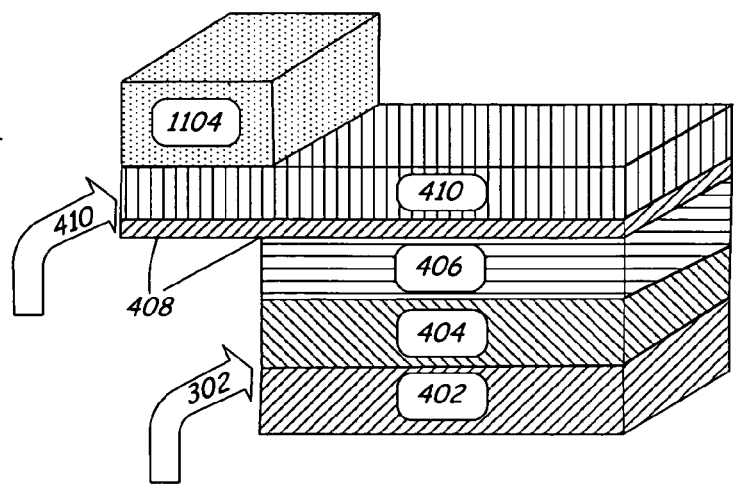
Figures 7, 11:
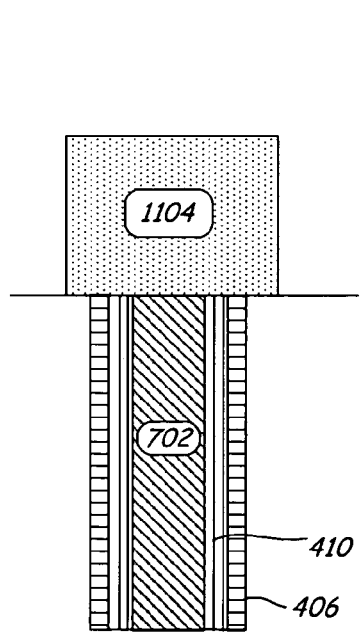
Figures 8, 11:
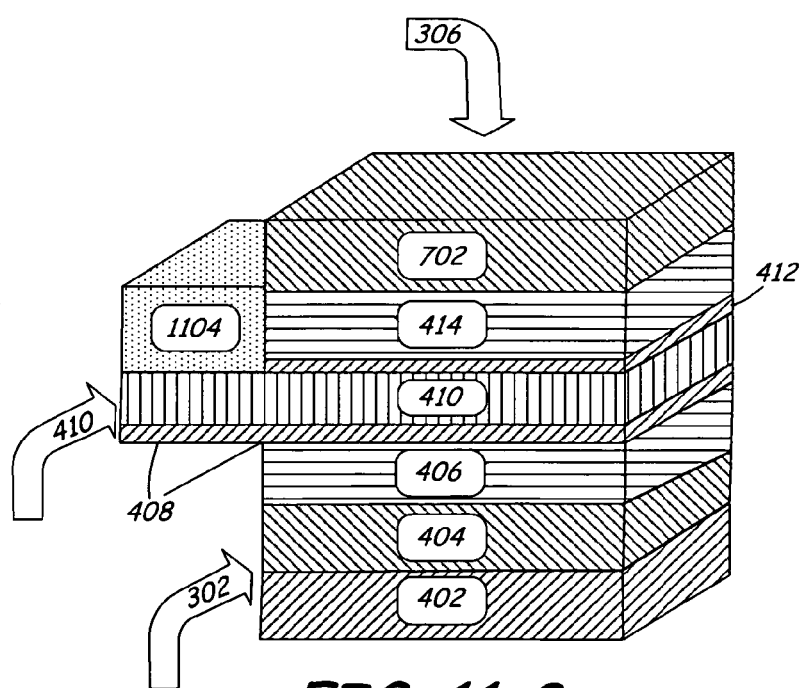

FIG. 3-1 is an air bearing surface view of a magnetic sensor 300 in accordance with an embodiment of the present invention. Magnetic sensor 300 includes a bottom electrode 302, a middle electrode 304 and a top electrode 306. A first sensor 308 is disposed between bottom electrode 302 and middle electrode 304, and a second sensor 310 is disposed between middle electrode 304 and top electrode 306.

In operation, a sensing current 312 flows from middle electrode 304 to bottom electrode 302 and top electrode 306 in a manner shown in FIG. 3-1. Specifically, a first portion 312A of sensing current 312 flows from middle electrode 304 to bottom electrode 302 via first sensor 308 in a direction perpendicular to surface planes of the layers of magnetic sensor 300. Similarly, a second portion 312B of sensing current 312 flows form middle electrode 304 to top electrode 306 via second sensor 310 in a direction perpendicular to surface planes of the layers of magnetic sensor 300. Thus, the configuration shown in FIG. 3-1 essentially comprises two current-perpendicular-to-plane (CPP) sensors electrically in parallel, which can produce a differential read-back signal 314

(FIG. 3-2) that includes complementary read-back signals 314A and 314B referenced to one another. In other words, an amplitude of differential read-back signal 314 will ideally be equal to a sum of individual amplitudes of signals 314A and 314B. CPP magnetic sensor 300 provides a significant improvement in signal-to-noise ratio (SNR) over prior art magnetic sensors that produce a single read-back signal referenced to ground. Details regarding first sensor 308 and second sensor 310 are provided below in connection with FIGS. 4 through 7.

Figure 4:
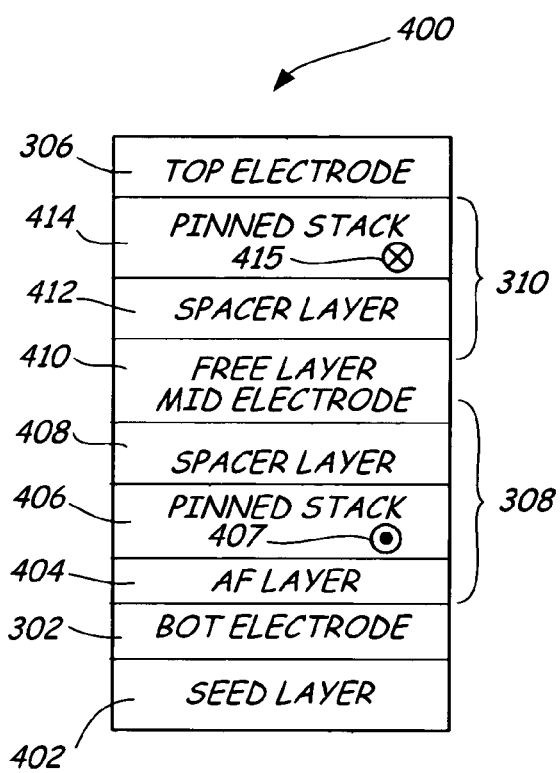
FIGS. 4 through 7 are air bearing surface views of magnetic sensors in accordance with more specific embodiments of the present invention.
Figure 5:
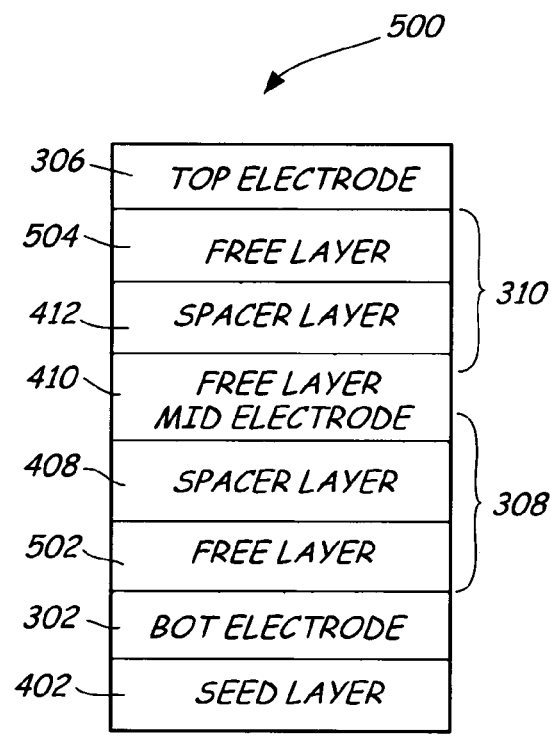
Figure 6:
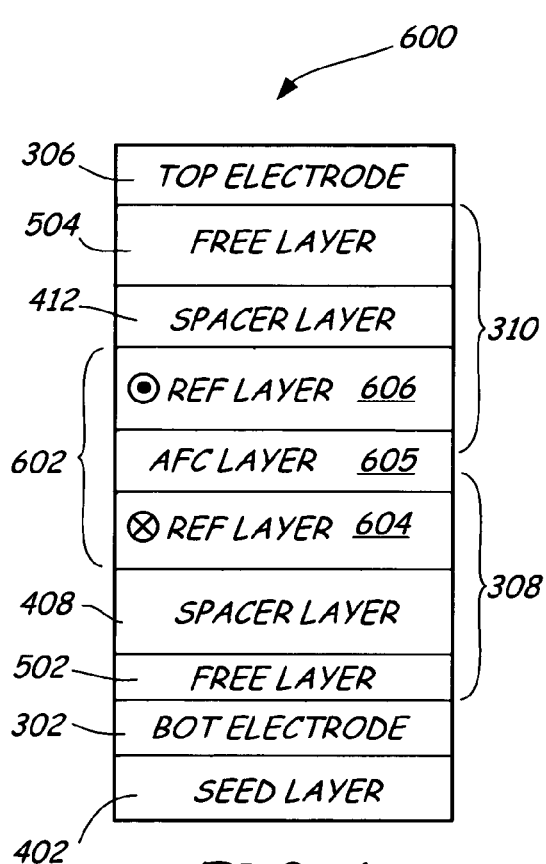
Figure 7:
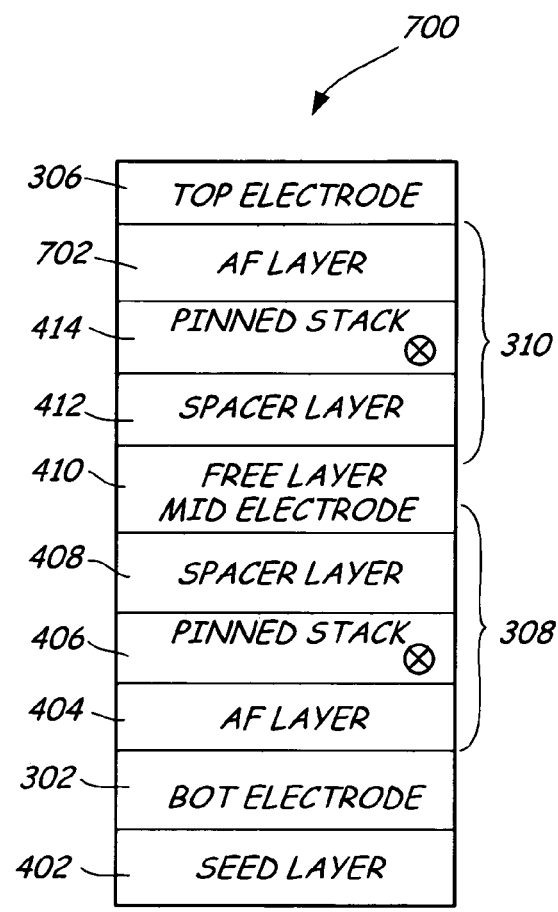

FIGS. 4 through 7 show more specific embodiments of magnetic sensors of the present invention. The same reference numerals are used to represent the same or similar elements of magnetic sensors 300 (FIG. 3), 400 (FIG. 4) and 500 (FIG. 5), 600 (FIG. 6) and 700 (FIG. 7). It should be noted that the sensing current Is flows through the magnetic sensors of FIGS. 4 through 7 in a manner similar to that shown in FIG. 3. However, for simplification, the sensing current directions are not shown in FIGS. 4 through 7. Magnetic sensor 400, shown in FIG. 4, is a modified synthetic antiferromagnetic (SAF) stack with an additional thin antiferromagnetic (AF) stabilizing layer. Magnetic sensor 400 comprises (with a thickness range for each layer in parenthesis) a seed layer (10-20 Å) 402 that is formed over a substrate (not shown), a bottom electrode 302, an AF pinning or stabilizing layer (2-10 Å) 404, a first pinned stack (20-40 Å) 406 whose magnetization direction is shown by arrow 407 (head of an arrow pointing out of the plane of the paper), a first spacer layer (2-20 Å) 408, a combined free layer and middle electrode (35-80 Å) 410, a second spacer layer (2-20 Å) 412, a second pinned stack (20-40 Å) 414 whose magnetization direction is shown by arrow 415 (head of an arrow pointing into the plane of the paper) and top electrode 306. For simplification, protection or cap layers are not shown.

In general, seed layer 402 is any layer deposited to modify the crystallographic texture or grain size of the subsequent layers. Seed layer 402 may be formed of tantalum (Ta), zirconium (Zr), ruthenium (Ru) or aluminum oxide ($Al_2O_3$), for example. AF layer 404 may be formed of manganese-platinum (MnPt), nickel-manganese (NiMn) or iridium-manganese (IrMn), for example. Each of first pinned stack 406 and second pinned stack 414 include a first ferromagnetic layer (not shown) and a second ferromagnetic layer (not shown) separated from each other by an antiferromagnetic coupling (AFC) layer (not shown). The first and second ferromagnetic layers may be formed of CoFe and the AFC layer may be made of Ru. The composition of first spacer layer 408 and second spacer layer 412 is discussed in detail further below. Free layer 410 may be formed of a single layer of a cobalt-iron (CoFe), for example. Electrodes 302 and 306, and electrode portion of layer 410, may be formed of electrically conductive materials such as copper (Cu), silver (Ag), gold (Au), etc.

As can be seen in FIG. 4, AF pinning layer 404, first pinned stack 406, first spacer layer 408 and a lower portion of region 410 forms first sensor 308. Similarly, second pinned stack 414, second spacer layer 412 and an upper portion of region 410 form second sensor 310. In some embodiments, first spacer layer 408 and second spacer layer 412 are metallic layers preferably made of Cu, although they may also be made of Au or Ag. In such embodiments, each of sensors 308 and 310 is a current-perpendicular-to-plane (CPP) spin valve sensor due to the presence of the metallic layer between the pinned and free layers. In other embodiments, first spacer layer 408 and second spacer layer 412 are nonmagnetic nonconductive layers (barrier layers) formed of $Al_2O_3$ or titanium oxide, for example. In such embodiments, each of sensors 308 and 310 is a CPP tunneling junction sensor due to the presence of the nonmagnetic nonconductive layer between the pinned and free layers.

FIG. 5 shows a magnetic sensor similar to that of FIG. 4. However, in magnetic sensor 500, first free layer 502 and second free layer 504 are included instead of first pinned stack 406 (FIG. 4) and second pinned stack 414 (FIG. 4). Magnetostatic interaction among the three free layers (502, 410 and 504) of magnetic sensor 500 generate a so-called scissoring field (magnetic moments of the three free layers (502, 410 and 504) form a scissoring orientation with respect to each other). Once magnetic sensor 500 experiences a magnetic field of the recording medium, the magnetization vectors tilt in opposite directions between every two adjacent free layers. When the sensing current passes through magnetic sensor 500, it operates in a manner similar to the above-described magnetic sensors 300 and 400 of the present invention. First free layer 502 and second free layer 504 may each be formed of a single CoFe layer, for example, having a thickness of 20-40 Å. The remaining elements of magnetic sensor 500 are similar to the elements of magnetic sensor 400 (FIG. 4) described above.

FIG. 6 shows a magnetic sensor similar to that of FIG. 5. However, in magnetic sensor 600, a multi-layered middle electrode 602 is included instead of combined free layer and middle electrode 410 (FIGS. 4 and 5). As can be seen in FIG. 6, multi-layered middle electrode 602 includes a first reference (ferromagnetic) layer (10-30 Å) 604 and a second reference (ferromagnetic) layer (10-30 Å) 606 separated from each other by an AFC layer (2-14 Å) 605 of nonmagnetic material. First ferromagnetic layer 604 and second ferromagnetic layer 606 may both be formed of CoFe. AFC layer 605 may be made of Ruthenium (Ru). The sensing current flows through first sensor 308 and second sensor 310 in a manner similar to that described above. FIG. 7 shows a magnetic sensor that is substantially similar to that of FIG. 4. Magnetic sensor 700 includes an additional AF pinning layer 702 and the magnetization direction of both pinned stacks 406 and 414 is the same. The remaining elements of magnetic sensor 700 are substantially similar to the elements of magnetic sensor 400. Also, magnetic sensors 700 and 400 operate in a similar manner.

Figures 1, 8:
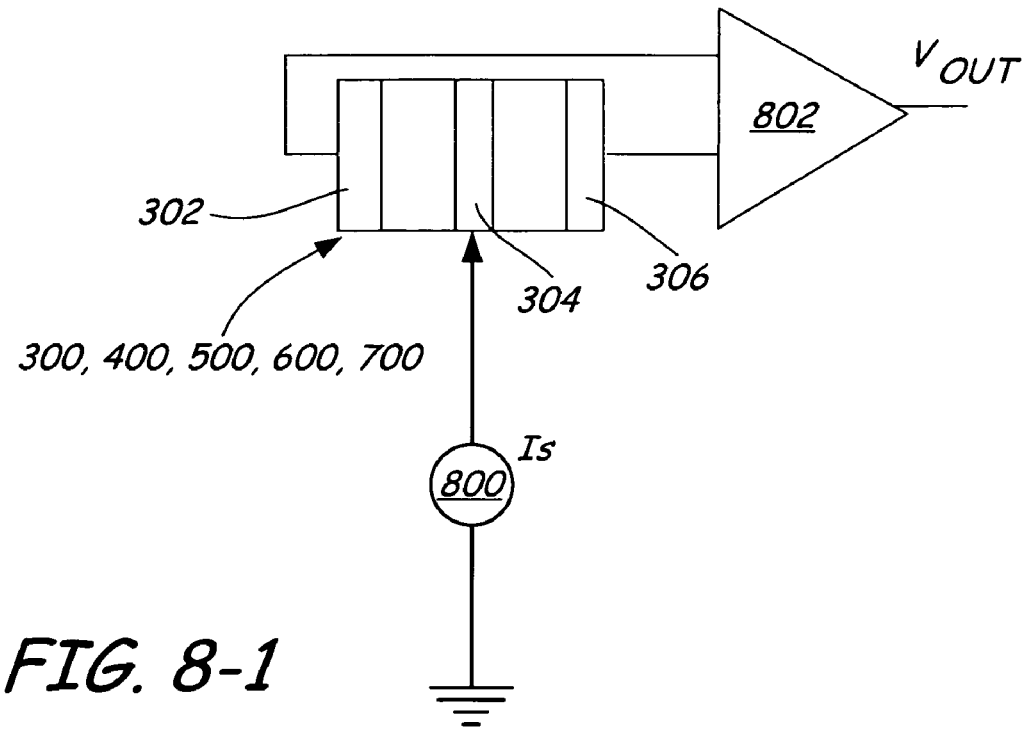
Figures 2, 8:
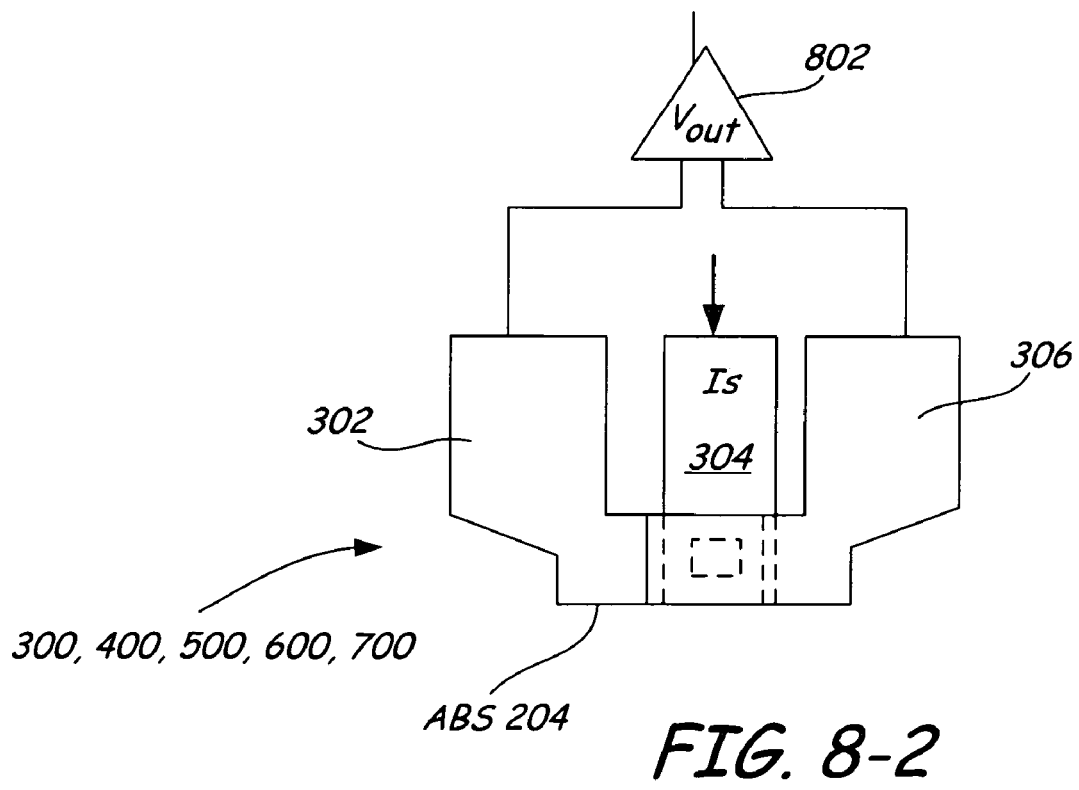
Figures 1, 9:
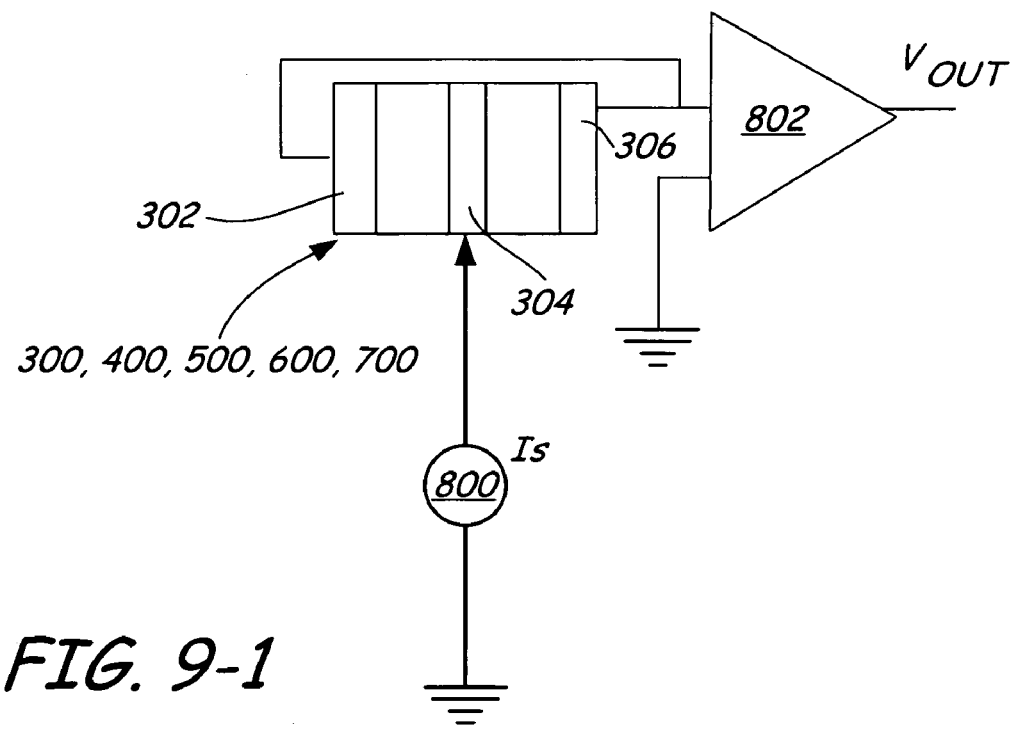
Figures 2, 9:
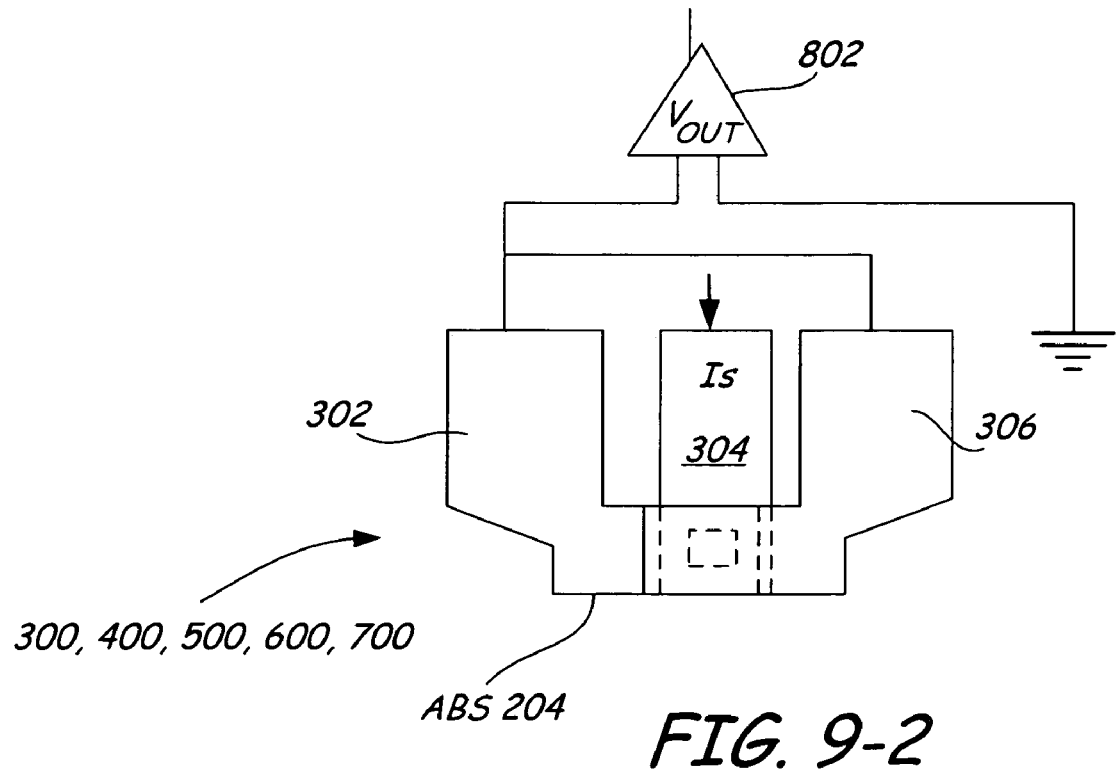

FIGS. 8-1 and 8-2 and 9-1 and 9-2 show three terminal and two terminal devices formed from the magnetic sensors (such as 300, 400, 500, 600 and 700) of the present invention. In FIG. 8-1, middle electrode 304 is connected to a current/voltage source 800 that provides sensing current Is. Bottom electrode 302 and top electrode 306 are each connected to a separate input of a preamplifier 802, which amplifies signals produced due to resistance changes in magnetic sensor 300, 400, 500, 600, 700. Since each of the three contacts 302, 304 and 306 is connected to a separate input/output of source 800 and preamplifier 802, magnetic sensor 300, 400, 500, 600, 700 forms a three-terminal device. Source 800 and preamplifier 802, which is typically a differential amplifier, are mounted on a printed circuit board (PCB) (not shown) included in disc drive 100. FIG. 8-2 is a top view of the three terminal device of FIG. 8-1. In FIG. 9-1, bottom electrode 302 and top electrode 306 are coupled to a single input of preamplifier 802, thereby forming a two-terminal device. FIG. 9-2 is a top view of the two terminal device of FIG. 9-1. It should be noted that, unlike the differential read-back signal produced by the three terminal device, the two-terminal device produces a single-ended read-back signal.

As mentioned above, magnetic read and write heads are carried by a slider. Such sliders, as well as the read and write heads, are produced by using thin film deposition techniques. In such a process, an array of sliders are formed on a common substrate or wafer. The wafer is inspected, and is then sliced to produce bars, with a row of sliders in a side-by-side pattern on each bar. The bars are then lapped at the surface that will eventually face the recording medium to obtain the desired magnetoresistive (MR) element height (also referred to as the stripe height). After lapping, an air bearing pattern is formed on the bars and the bars are diced to produce individual sliders. Methods of forming magnetic sensors of the present invention, which are included in the sliders, are described below in connection with FIGS. 10 through 12.

Figure 10B:
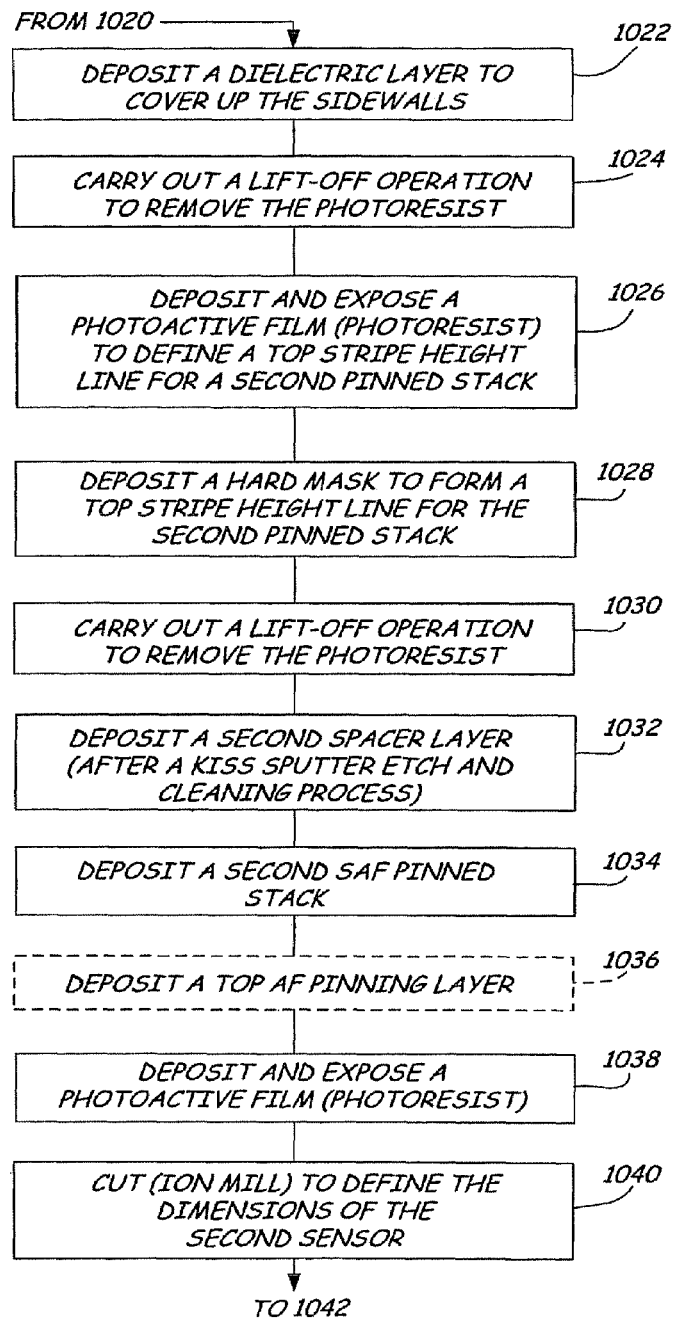
FIG. 10 is a flowchart of a method embodiment of the present invention.
Figure 10C:
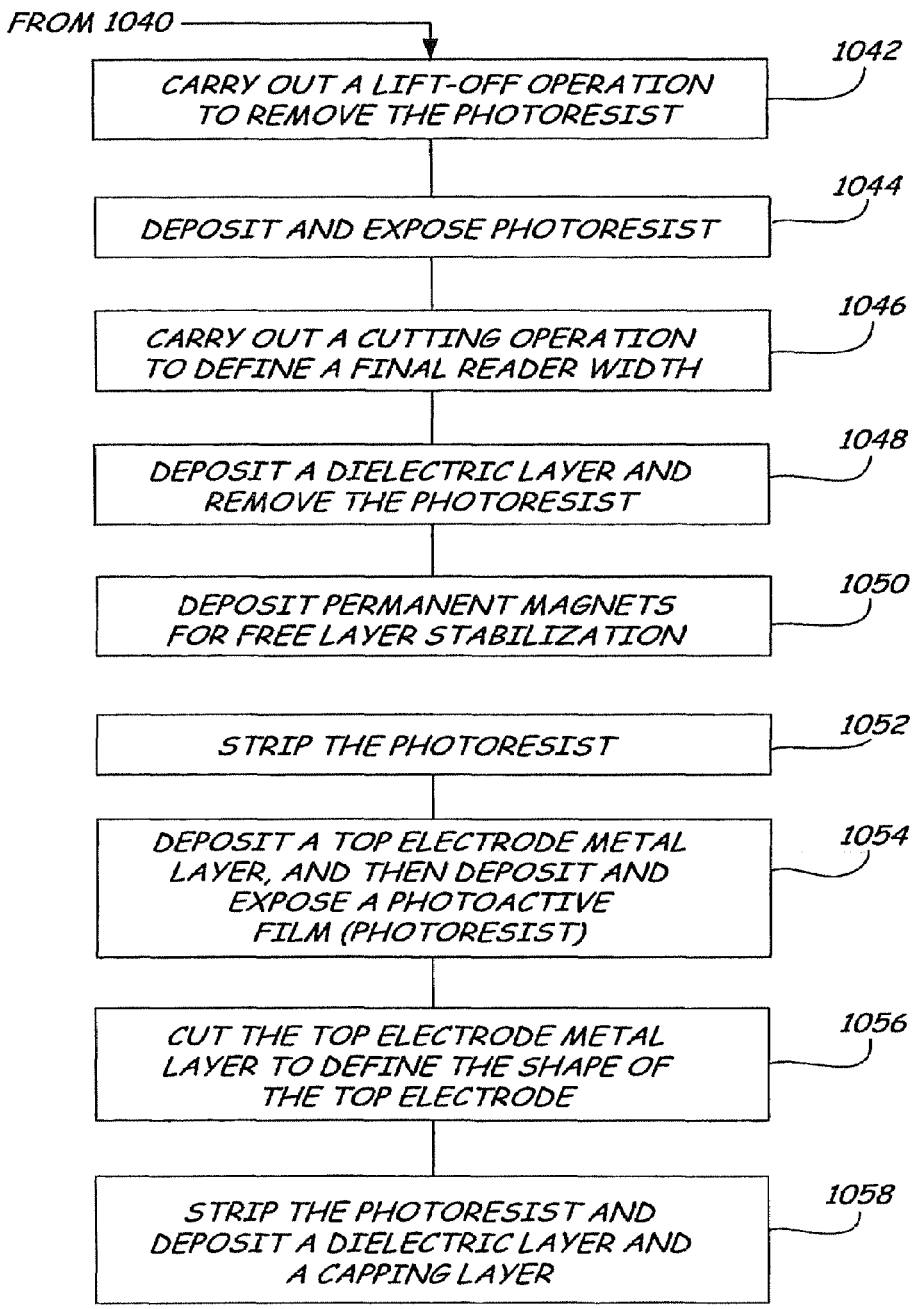

FIG. 10 is a flowchart 1000 of an example method of forming magnetic sensor 400 (FIG. 4) or 700 (FIG. 7) of the present invention. FIG. 11 illustrates several top and cross-sectional views of different magnetic sensor layers during fabrication of a magnetic sensor in accordance with the method of FIG. 10. The same reference numerals are used to represent the same or similar elements of FIGS. 4, 7 and 11. In FIG. 10, at step 1002, a seed layer (402) and a bottom electrode (302) are deposited. At step 1004, an AF pinning layer (404) is deposited. This is followed by depositing a bottom or first SAF pinned stack (406) at step 1006. At step 1008, a photoactive film (photoresist) is deposited and exposed, and a cutting operation to define a top stripe height line 1102 of the first sensor is then carried out. At step 1010, a dielectric layer is deposited to cover up the sidewalls. A lift-off operation to remove the photoresist is then carried out at step 1012. Top and cross-sectional views of the device after steps 1002 through 1012 have been carried out are shown in FIGS. 11-1 and 11-2, respectively.

At step 1014, a first spacer layer (408) is deposited (after a kiss sputter etch and cleaning process is carried out). A free layer (410) is then deposited at step 1016. At step 1018, photoresist is deposited and exposed. The free layer (410) is then cut to form an intermedium electrode at step 1020. At step 1022, a dielectric layer is deposited to cover up the sidewalls. A lift-off operation is then carried out to remove the photoresist at step 1024. Top and cross-sectional views of the device after steps 1014 through 1024 have been carried out are shown in FIGS. 11-3 and 11-4, respectively.

At step 1026, photoresist is deposited and exposed to define a top stripe height line for a second pinned stack (414). A hard mask (silicon monoxide (SiO) or silicon nitride (SiN)) 1104 is deposited to form the top stripe height line for the second pinned stack (414) at step 1028. At step 1030, a lift-off operation to remove the photoresist is carried out. Top and cross-sectional views of the device after steps 1026 through 1030 have been carried out are shown in FIGS. 11-5 and 11-6, respectively.

At step 1032, a second spacer layer (412) is deposited (after a kiss sputter etch and cleaning process). A second SAF pinned stack (414) is then deposited at step 1034. At optional step 1036, a second AF pinning layer (702) is deposited. Photoresist is then deposited and exposed at step 1038. At step 1040, a cutting (or ion milling) process is carried out to define the dimensions of the second sensor. A lift-off operation to remove the photoresist is carried out at step 1042. Top and cross-sectional views of the device after steps 1032 through 1042 have been carried out are shown in FIGS. 11-7 and 11-8, respectively.

At step 1044, photoresist is deposited and exposed. A cutting operation is then carried out to define a final reader width at step 1046. At step 1048, a dielectric layer is deposited and the photoresist is removed. Top and cross-sectional views of the device after steps 1044 through 1048 have been carried out are shown in FIGS. 11-9 and 11-10, respectively.

At step 1050, permanent magnets (not shown) are deposited to stabilize the free layers. Photoresist is stripped at step 1052. At step 1054, a top electrode metal layer is deposited, and a photoactive film (photoresist) is deposited and exposed. At step 1056, the top electrode metal layer is cut to define the shape of the top electrode. The photoresist is then stripped and a dielectric layer and capping layer are deposited at step 1058.

FIG. 12 is a flowchart 1200 of an example method of forming magnetic sensor 600 (FIG. 6) of the present invention. At step 1202, a seed layer (402) and a bottom electrode (302) are deposited. A first free layer (502) is deposited at step 1204. At step 1206, a first spacer layer (408) is deposited. A first reference layer (604) (a first half of an SAF stack (602)) is deposited at step 1208. At step 1210, an AFC layer (605) is deposited. At step 1212, a photoactive film (photoresist) is deposited and exposed, and a cutting operation to define a top stripe height line of the first sensor is then carried out. At step 1214, a dielectric layer is deposited to cover up the sidewalls. A lift-off operation to remove the photoresist is then carried out at step 1216. A second reference layer (606) (a second half of the SAF stack (602)) is deposited at step 1218. At step 1220, a second spacer layer (412) is deposited. A second free layer (504) is deposited at step 1222. At step 1224, a top electrode is deposited. A cap layer is deposited at step 1226. At step 1228, photoresist is deposited and exposed. Stack 600 is then cut (ion milled) to define a final reader width and to form a middle electrode at step 1230. Note that the ion milling process has to be stopped within the second spacer layer (412). At step 1232, a dielectric layer is deposited to cover up the sidewalls. A lift-off operation is then carried out to remove the photoresist at step 1234. It should be noted that magnetic sensor 500 (FIG. 5) can by fabricated using process similar to those described in FIGS. 10 through 12.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetic sensor while maintaining substantially the same functionality without departing from the scope and spirit of the present invention. In addition, although the preferred embodiment described herein is directed to a differential/dual CPP magnetic sensor for a disc storage system, it will be appreciated by those skilled in the art that the teachings of the present invention can be applied to any type of storage system or device that senses magnetically, without departing from the scope and spirit of the present invention.

What is claimed is:

1. A magnetic sensor comprising:
a bottom electrode;
a first sensor disposed above the bottom electrode;
a middle electrode disposed above the first sensor;
a second sensor disposed above the middle electrode; and
a top electrode disposed above the second sensor,
wherein the first sensor comprises a first spacer layer and the second sensor comprises a second spacer layer,
wherein the first spacer layer and the second spacer layer are adjacent to the middle electrode, and
wherein the bottom electrode, the first sensor, the middle electrode, the second sensor and the top electrode are so disposed and arranged that a current flows from the middle electrode through the first sensor to the bottom electrode and from the middle electrode through the second sensor to the top electrode to form a parallel electrical connection of the first sensor and the second sensor.

2. The magnetic sensor of claim 1 wherein the bottom electrode, the first sensor, the middle electrode, the second sensor and the top electrode are so disposed and arranged that a differential read-back signal is produced.

3. The magnetic sensor of claim 1 wherein the first spacer layer and the second spacer layer are formed of an electrically conductive metal.

4. The magnetic sensor of claim 3 wherein the electrically conductive metal is selected form the group consisting of copper (Cu), silver (Ag) and gold (Au).

5. The magnetic sensor of claim 1 wherein each of the first spacer layer and the second spacer layer is a barrier layer formed of a substantially insulating material.

6. The magnetic sensor of claim 5 wherein the substantially insulating material is selected from the group consisting of aluminum oxide and titanium oxide.

7. The magnetic sensor of claim 1 wherein the bottom electrode and the top electrode are electrically coupled together to produce a single-ended read-back signal.

8. The magnetic sensor of claim 1 wherein a sensing current flows substantially perpendicular to surface planes of layers of the first sensor and the second sensor.

9. A magnetic sensor comprising:
a first sensor having a first spacer layer;
a second sensor having a second spacer layer; and
three electrodes,
wherein the first sensor, the second sensor and the three electrodes are so disposed and arranged that a current flows from a first one of the three electrodes through the first sensor to a second one of the three electrodes and from the first one of the three electrodes through the second sensor to a third one of the three electrodes to form a parallel electrical connection of the first sensor and the second sensor,
wherein the first one of the three electrodes is a middle electrode, the second of one of the three electrodes is a bottom electrode and the third one of the three electrodes is a top electrode, and wherein the first sensor is disposed between the bottom electrode and the middle electrode and the second sensor is disposed between the middle electrode and the top electrode, and
wherein the first spacer layer and the second spacer layer are adjacent to the middle electrode.

10. The magnetic sensor of claim 9 wherein the first sensor, the second sensor and the three electrodes are so disposed and arranged that a differential read-back signal is produced.

11. The magnetic sensor of claim 9 wherein the first spacer layer and the second spacer layer are formed of an electrically conductive metal.

12. The magnetic sensor of claim 11 wherein the electrically conductive metal is selected form the group consisting of copper (Cu), silver (Ag) and gold (Au).

13. The magnetic sensor of claim 9 wherein each of the first spacer layer and the second spacer layer is a barrier layer formed of a substantially insulating material.

14. The magnetic sensor of claim 13 wherein the substantially insulating material is selected from the group consisting of aluminum oxide and titanium oxide.

15. The magnetic sensor of claim 9 wherein two of the three electrodes are electrically coupled together to produce a single-ended read-back signal.

16. The magnetic sensor of claim 9 wherein a sensing current flows substantially perpendicular to surface planes of layers of the first sensor and the second sensor.

17. A magnetic sensor comprising:
a first sensing means for sensing signal fields;
a second sensing means for sensing signal fields; and
a middle electrode,
wherein the first sensing means comprises a first spacer layer and the second sensing means comprises a second spacer layer,
wherein the first spacer layer and the second spacer layer are adjacent to the middle electrode of the magnetic sensor, and
wherein the first sensing means and the second sensing means are electrically connected in parallel.

18. The magnetic sensor of claim 17 wherein the first spacer layer and the second spacer layer are formed of an electrically conductive metal.

19. The magnetic sensor of claim 17 wherein each of the first spacer layer and the second spacer layer is a barrier layer formed of a substantially insulating material.

20. The magnetic sensor of claim 1 wherein the middle electrode is a free magnetic layer.

21. The magnetic sensor of claim 20 wherein each of the bottom electrode and the top electrode is a read shield.

22. The magnetic sensor of claim 1 wherein each of the first sensor and the second sensor comprise a synthetic antiferromagnetic (SAF) pinned stack.

23. The magnetic sensor of claim 22 wherein each of the first sensor and the second sensor further comprise an antiferromagnetic layer.

* * * * *

UNITED STATES PATENT AND TRADEMARK OFFICE
CERTIFICATE OF CORRECTION

PATENT NO. : 7,436,632 B2  Page 1 of 1
APPLICATION NO. : 10/880879
DATED : October 14, 2008
INVENTOR(S) : Shaoping Li et al.

It is certified that error appears in the above-identified patent and that said Letters Patent is hereby corrected as shown below:

Column 9
Line 12, delete "form" and insert --from--

Column 10
Line 5, delete "form" and insert --from--

Signed and Sealed this

Tenth Day of November, 2009

David J. Kappos
*Director of the United States Patent and Trademark Office*